US008641099B2

(12) United States Patent
Cuva et al.

(10) Patent No.: US 8,641,099 B2
(45) Date of Patent: Feb. 4, 2014

(54) COUPLING WITH ONE-PIECE PLURAL NIPPLES

(75) Inventors: William J. Cuva, Jupiter, FL (US); Ricky A. Daigle, Barkhamsted, CT (US)

(73) Assignee: United Technologies Corporation, Hartford, CT (US)

( * ) Notice: Subject to any disclaimer, the term of this patent is extended or adjusted under 35 U.S.C. 154(b) by 57 days.

(21) Appl. No.: 13/542,075

(22) Filed: Jul. 5, 2012

(65) Prior Publication Data

US 2014/0008908 A1  Jan. 9, 2014

(51) Int. Cl.
*F16L 39/00* (2006.01)
(52) U.S. Cl.
USPC .......................... 285/124.4; 285/92; 285/386
(58) Field of Classification Search
USPC .................. 285/124.4, 92, 354, 386
See application file for complete search history.

(56) References Cited

U.S. PATENT DOCUMENTS

| 3,263,479 | A | * | 8/1966 | Johnson | 72/416 |
|---|---|---|---|---|---|
| 3,944,264 | A | * | 3/1976 | Mong et al. | 285/124.4 |
| 4,893,845 | A | * | 1/1990 | Bartholomew | 285/124.4 |
| 5,058,930 | A | | 10/1991 | Schlosser | |
| 5,131,690 | A | * | 7/1992 | Mano | 285/92 |
| 5,148,863 | A | * | 9/1992 | Fouts et al. | 165/149 |
| 5,388,866 | A | * | 2/1995 | Schlosser | 285/92 |
| 5,890,746 | A | * | 4/1999 | Mueller | 285/92 |
| 6,302,447 | B1 | * | 10/2001 | Lee | 285/86 |
| 6,520,545 | B2 | * | 2/2003 | Johll et al. | 285/124.1 |
| 6,581,981 | B2 | * | 6/2003 | Cooper | 285/354 |
| 6,905,142 | B2 | * | 6/2005 | Do et al. | 285/89 |
| 7,175,207 | B2 | * | 2/2007 | Prochiner | 285/124.1 |
| 7,258,369 | B2 | * | 8/2007 | Martin | 285/124.5 |
| 7,571,937 | B2 | * | 8/2009 | Patel | 285/92 |
| 7,883,117 | B2 | * | 2/2011 | Marc et al. | 285/86 |
| 2006/0151994 | A1 | * | 7/2006 | Marc et al. | 285/92 |
| 2007/0164566 | A1 | * | 7/2007 | Patel | 285/386 |
| 2007/0267869 | A1 | * | 11/2007 | Patel | 285/386 |

* cited by examiner

*Primary Examiner* — Aaron Dunwoody
(74) *Attorney, Agent, or Firm* — Carlson, Gaskey & Olds, PC

(57) ABSTRACT

A fluid coupling assembly has a single fluid connection, including a plate and at least a pair of nipples extending away from the plate in a first direction, and at least a pair of connection pipes connected to each of the nipples extending from the plate in a second opposed direction. The nipples include a thread at an outer periphery, a ramped surface spaced in a direction beyond the thread and towards the plate, and a ditch beyond the ramped surface. A fluid coupling has a thread at an inner periphery received on the thread on the nipple, and the coupling has a plurality of circumferentially spaced fingers spaced by grooves, with the fingers being snapped into the ditch and is biased against the ramped surface. The plate, at least a pair of nipples and at least a pair of connection pipes are all formed of an integral piece of metal.

20 Claims, 3 Drawing Sheets

COUPLING WITH ONE-PIECE PLURAL NIPPLES

STATEMENT REGARDING FEDERALLY SPONSORED RESEARCH OR DEVELOPMENT

This invention was made with government support under contract number N00019-02-C-3003 awarded by United States Navy. The government has certain rights in the invention.

BACKGROUND OF THE INVENTION

Fluid couplings are utilized in any number of industrial applications. One type of fluid coupling includes a nipple having threads at an outer periphery, and a component having threads at an inner periphery which is connected to the nipple. The component is attached to a fluid connection, such as a tube ferrule.

As the component is tightened on the threads on the nipple, a plurality of circumferentially spaced fingers are ramped upwardly on a frustoconical surface associated with the nipple. These fingers snap into a ditch beyond the frustoconical surface, and this provides a force locking the component to the nipple such that the fluid connection is extremely reliable.

Such fluid connections are utilized in any number of industrial applications. As one major example, they are utilized to connect fuel tubes to a spray bar in gas turbine engines. Spray bars are utilized to direct fuel spray into a location where the fuel will be ignited.

One application for a spray bar is in an augmentor for a gas turbine engine. In an augmentor, there are plural supply lines leading to the spray bar.

In the prior art, a connecting member has been brazed to the two separate couplings such that they can be used together. However, by brazing the two together, there may be distortion, location issues, and additional failure points. Further, particularly when used in a spray bar, there are vibration and durability issues which raise challenges due to the added failure points, location issues, and distortion as mentioned above.

SUMMARY OF THE INVENTION

In a featured embodiment, a fluid coupling assembly has a connection, including a plate and at least a pair of nipples extending away from the plate in a first direction, and at least a pair of connection pipes connected to each of the nipples extending from the plate in a second opposed direction. The nipples include a thread at an outer periphery, a ramped surface spaced in a direction beyond the thread and towards the plate, and a ditch beyond the ramped surface. A fluid coupling is connected to each of the nipples. The fluid coupling has a thread at an inner periphery received on the thread on the nipple. The coupling has a plurality of circumferentially spaced fingers spaced by grooves, with the fingers snapped into the ditch and biased against the ramped surface. The plate, at least a pair of nipples and at least a pair of connection pipes are all formed of an integral piece of metal.

In another embodiment according to the previous embodiment, the connection pipe extends away from the second face of the plate at an angle that is non-parallel to a planer surface of the plate.

In another embodiment according to any of the previous embodiments, the metal is a nickel based alloy.

In another embodiment according to any of the previous embodiments, the plate has a central hole for receiving a bolt to secure said plate to a mount surface.

In another embodiment according to any of the previous embodiments, a seal pack is associated with the plate, and between the plate and fluid couplings on the first side of the plate.

In another embodiment according to any of the previous embodiments, the bolt tightens the seal pack onto the plate and against the housing.

In another embodiment according to any of the previous embodiments, nipples extend at a non-parallel angle from the plate relative to an angle of extension for the pipe connection.

In another featured embodiment, a fuel bar for use on a gas turbine engine has at least a pair of fuel pipes each leading to a plurality of spray nozzles. The fuel pipes extend to a fluid coupling assembly. The fluid coupling assembly includes a single fluid connection having a plate and at least a pair of nipples extending away from the plate in a first direction, and at least a pair of connection pipes connected to each of the nipples extending from the plate in a second opposed direction. The nipples include a thread at an outer periphery, a ramped surface spaced in a direction beyond the thread and towards the plate, and a ditch beyond the ramped surface. A fluid coupling is connected to each of the nipples. The fluid coupling has a thread at an inner periphery received on the thread on the nipple. The coupling has a plurality of circumferentially spaced fingers spaced by grooves, with the fingers snapped into the ditch and biased against the ramped surface. The plate, at least a pair of nipples and at least a pair of connection pipes are all formed of an integral piece of metal.

In another embodiment according to any of the previous embodiments, the connection pipe extends away from the second face of the plate at an angle that is non-parallel to a planer surface of the plate.

In another embodiment according to any of the previous embodiments, the metal is a nickel based alloy.

In another embodiment according to any of the previous embodiments, the plate has a central hole for receiving a bolt to secure the plate to a mount surface.

In another embodiment according to any of the previous embodiments, a seal pack is associated with the plate, and between the plate and fluid couplings on the first side of the plate.

In another embodiment according to any of the previous embodiments, a bolt tightens the seal pack onto the plate, and against the housing.

In another embodiment according to any of the previous embodiments, the nipples extend at a non-parallel angle from the plate relative to an angle of extension for the pipe connection.

In another featured embodiment, a gas turbine engine augmentor has a turbine exhaust case mounting a spray bar. A fuel bar has at least a pair of fuel pipes each leading to a plurality of spray nozzles. The fuel pipes extend to a fluid coupling assembly. A fluid coupling assembly has a single fluid connection with a plate and at least a pair of nipples extending away from the plate in a first direction, and at least a pair of connection pipes for being connected to each of the nipples extending from the plate in a second opposed direction. The nipples include a thread at an outer periphery, a ramped surface spaced in a direction beyond the thread and towards the plate, and a ditch beyond the ramped surface. A fluid coupling is connected to each of the nipples and has a thread at an inner periphery received on the thread on the nipple. The coupling has a plurality of circumferentially spaced fingers spaced by grooves, with the fingers being snapped into the ditch and biased against the ramped surface. The plate, at least a pair of nipples and at least a pair of connection pipes are all formed of an integral piece of metal.

In another embodiment according to the previous embodiment, the connection pipe extends away from the second face of the plate and at an angle that is non-parallel to a planer surface of the plate.

In another embodiment according to any of the previous embodiments, the metal is a nickel based alloy.

In another embodiment according to any of the previous embodiments, the plate has a central hole for receiving a bolt to secure the plate to a mount surface.

In another embodiment according to any of the previous embodiments, a seal pack is associated with the plate, and between the plate and fluid couplings on the first side of the plate. The bolt tightens the seal pack onto the plate, and against the housing.

In another embodiment according to any of the previous embodiments, the nipples extend at a non-parallel angle from the plate relative to an angle of extension for the pipe connection.

These and other features of the invention will be better understood from the following specifications and drawings, the following of which is a brief description.

DETAILED DESCRIPTION

Figure 1:
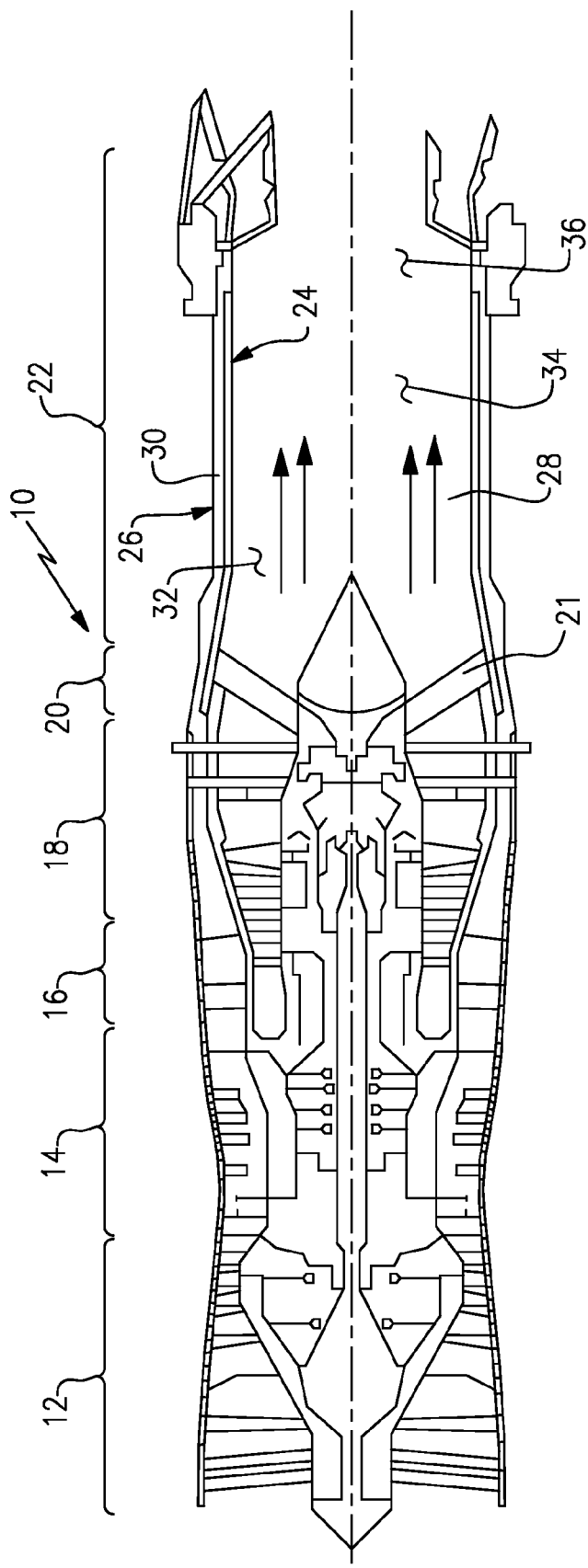
FIG. 1 schematically shows a gas turbine engine.

FIG. 1 shows a gas turbine 10 including a fan section 12, a compressor section 14, a combustor section 16, and a turbine section 18. Air entering into the fan section 12 is compressed and fed to the compressor section 14. In the compressor section 14, the incoming air from the fan section 12 is compressed and communicated to a combustor section 16. In the combustor section 16, the compressed air is mixed with fuel and ignited to generate a hot exhaust stream 28. The hot exhaust stream 28 is expanded across a turbine section 18, to drive the fan section 12 and the compressor section 14. In this example, the gas turbine engine 10 includes an augmenter section 20 where additional fuel is be mixed with the exhaust gases 28 and ignited to generate additional thrust. Fuel spray bars 21 are part of this augmentor section 20. The exhaust gases 28 flow from the turbine section 18 and the augmenter section 20 through an exhaust liner assembly 22.

The above gas turbine engine is exemplary, and the teachings of this application would extend to other types of gas turbine engines.

Figure 2:
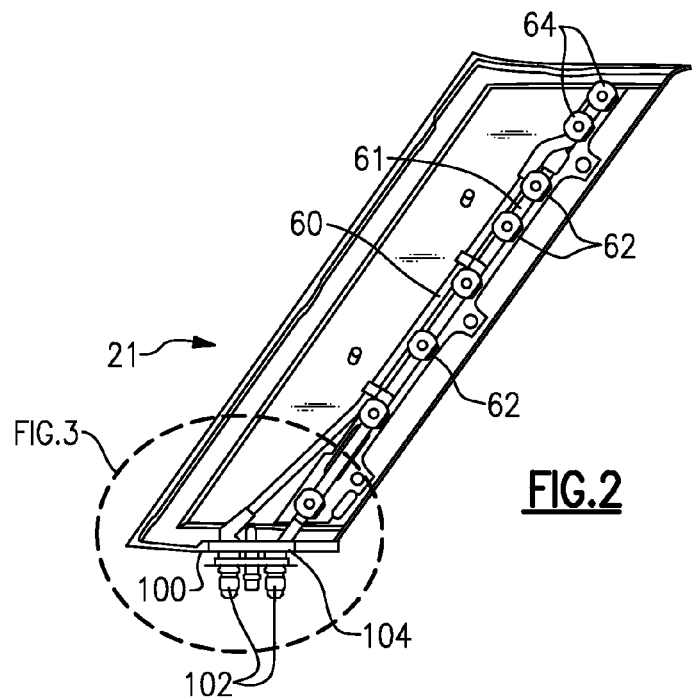
FIG. 2 shows a spray bar.

FIG. 2 shows a portion of a turbine exit case, including a spray bar structure 21. As shown, a plurality of injection nozzles 62 are connected to one tube 61, and a second tube 60 supplies fuel to other injection nozzles 64. The tubes 60 and 61 extend to a one-piece fluid connection 100, including two fluid connection nipples 102. As shown, a plate 104 connects the nipples 102.

Figure 3:
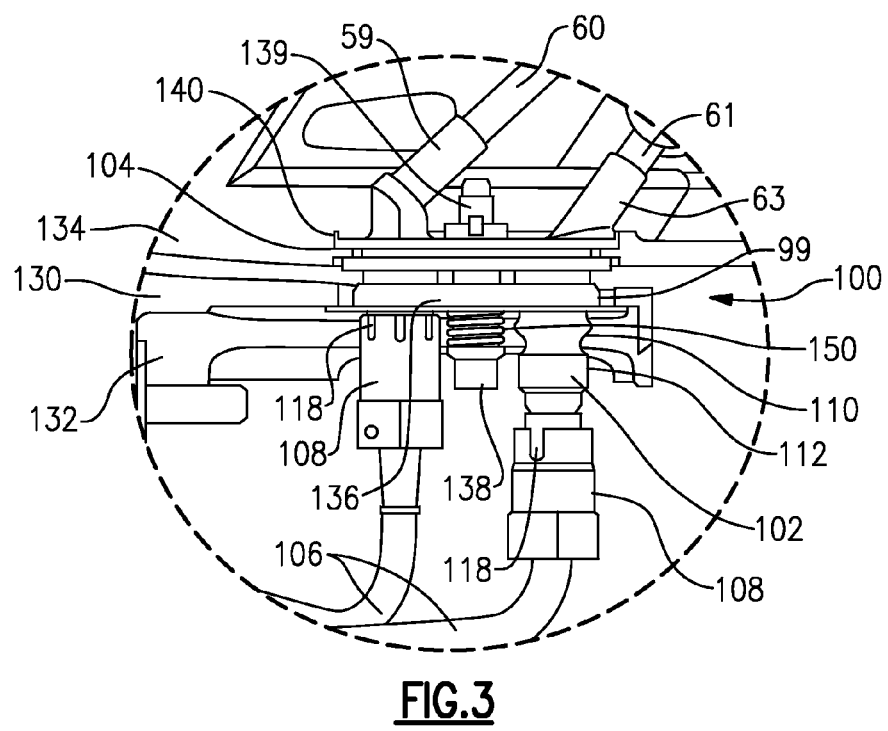
FIG. 3 shows a fluid connection.

FIG. 3 shows the complete fluid connection for the spray bar 21. As shown, the plate 104 connects the nipples 102, and also the connection pipes 59 and 63. As can be understood, the connection pipes 59 and 63 communicate with respective ones of the nipples 102 through internal fluid connections. Connection pipe 63 is connected to the tube 61, and connection pipe 59 is connected to the tube 60. The nipples 102 extend to couplings 108. A left hand coupling 108 is shown fully assembled, and a right hand coupling 108 is removed to show nipple 102.

A bolt 138 may be tightened within a nut 139 to tighten the plate 104 towards a housing 132. As shown, a seal pack 136/140 sits between housings 130, 132 and 134. Springs 150 assist in tightening the seal upwardly.

Figure 4A:
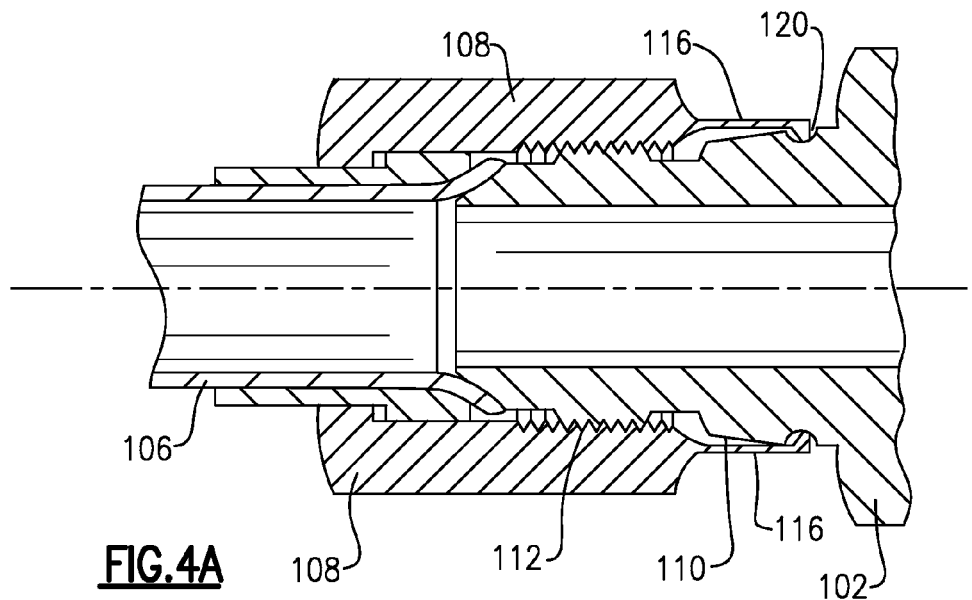
FIG. 4A shows a cross-section through a fully connected coupling.

FIG. 4A shows a cross-section through the combination of a nipple 102, and the coupling 108. As shown, there is a thread 112 on an outer periphery of the nipple 102 and a mating thread on an inner periphery of the coupling 108. A fluid connection 106 extends away from the coupling 108. As can be appreciated, the threads are followed by the ramped portion 110, and then the ditch 120 in that order, moving away from the coupling 108.

Figure 4B:
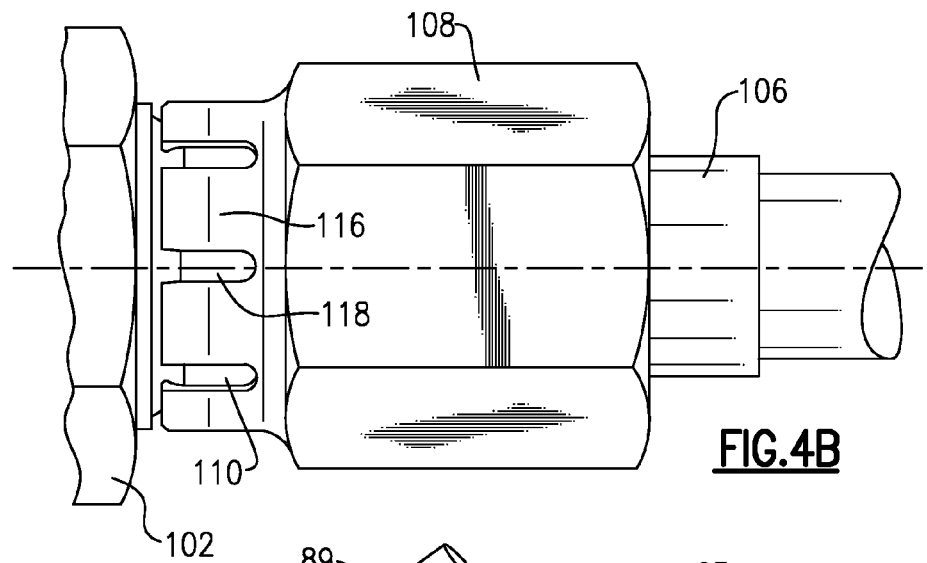
FIG. 4B shows an outside view of the fully connected coupling.

As shown in FIG. 4B, there are a plurality of grooves 118 and circumferentially spaced fingers 116 at a forward end of the coupling 108. The fingers ramp upwardly over a frustoconical portion 110, or ramped surface, on the outer periphery of the nipple, and snap into a ditch 120 beyond the frustoconical portion 110. These fingers 116 press, or are biased, against the outer surface of the nipple, and create forces to provide a tight engagement of the threads at 112.

Figure 5:
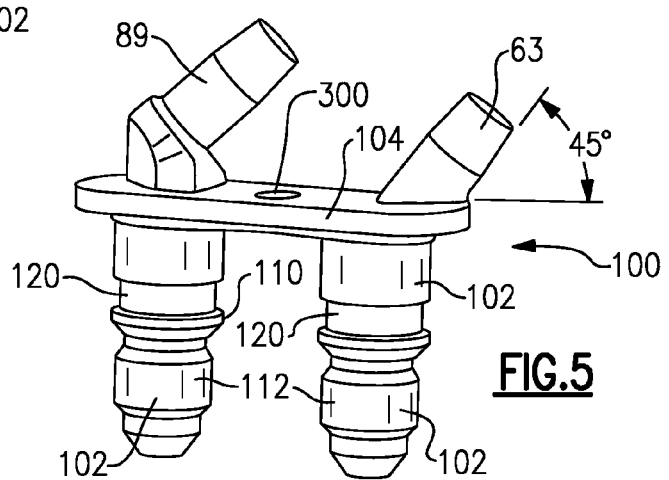
FIG. 5 is a perspective view of a dual fitting.

A connecting hole 300 in the plate 104 can be seen in FIG. 5, and serves to receive the bolt as shown in FIG. 3.

FIG. 5 shows the connection 100 including the connecting plate 104, the connection pipes 59 and 63, and the nipples 102. As shown, the connections 59 and 63 extend away from the plate 104 at an angle A. While angle A is illustrated as approximately 45°, any number of angles may be utilized. In general, as shown, the nipples 102 may extend generally perpendicularly to the plate 104, and non-parallel to the connection pipes 59 and 63. The connection 100 is formed in an integral piece of metal, such as by machining away material. The metal may be a nickel based alloy, such as Inconel™, or other appropriate metals.

Since the connection 100 is formed of a single piece of metal, the problems with the brazed connection as described in the Background of the Invention section of this application are avoided.

In addition, while two connections are shown, it should be understood that any number of other connections can be included.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fluid coupling assembly comprising:
a connection, including a plate and at least a pair of nipples extending away from said plate in a first direction, and at least a pair of connection pipes connected to each of said nipples extending from said plate in a second opposed direction, said nipples including a thread at an outer periphery, a ramped surface spaced in a direction beyond said thread and towards said plate, and a ditch beyond said ramped surface;
a fluid coupling connected to each of said nipples, said fluid coupling having a thread at an inner periphery received on said thread on said nipple, and said coupling having a plurality of circumferentially spaced fingers spaced by grooves, with said fingers snapped into said ditch and biased against said ramped surface; and said plate, said at least a pair of nipples and said at least a pair of connection pipes are all formed of an integral piece of metal.

2. The fluid coupling assembly as set forth in claim 1, wherein said connection pipe extending away from said second face of said plate at an angle which is non-parallel to a planer surface of said plate.

3. The fluid coupling assembly as set forth in claim 1, wherein said metal is a nickel based alloy.

4. The fluid coupling assembly as set forth in claim 1, wherein said plate has a central hole for receiving a bolt to secure said plate to a mount surface.

5. The fluid coupling assembly as set forth in claim 4, wherein a seal pack is associated with said plate, and between said plate and said fluid couplings on said first side of said plate.

6. The fluid coupling assembly as set forth in claim 5, wherein said bolt tightens said seal pack onto said plate, and against the housing.

7. The fluid coupling assembly as set forth in claim 1, wherein said nipples extend at a non-parallel angle from said plate relative to an angle of extension for said pipe connection.

8. A fuel bar for use on a gas turbine engine comprising:
at least a pair of fuel pipes each leading to a plurality of spray nozzles, and said fuel pipes extending to a fluid coupling assembly;
said fluid coupling assembly including a single fluid connection having a plate and at least a pair of nipples extending away from said plate in a first direction, and at least a pair of connection pipes connected to each of said nipples extending from said plate in a second opposed direction, said nipples including a thread at an outer periphery, a ramped surface spaced in a direction beyond said thread and towards said plate, and a ditch beyond said ramped surface, a fluid coupling connected to each of said nipples, said fluid coupling having a thread at an inner periphery received on said thread on said nipple, and said coupling having a plurality of circumferentially spaced fingers spaced by grooves, with said fingers snapped into said ditch and biased against said ramped surface; and
said plate, said at least a pair of nipples and said at least a pair of connection pipes are all formed of an integral piece of metal.

9. A fuel bar as set forth claim 8, wherein said connection pipe extending away from said second face of said plate at an angle which is non-parallel to a planer surface of said plate.

10. The fuel bar as set forth in claim 8, wherein said metal is a nickel based alloy.

11. The fuel bar as set forth in claim 8, wherein said plate has a central hole for receiving a bolt to secure said plate to a mount surface.

12. The fuel bar as set forth in claim 11, wherein a seal pack is associated with said plate, and between said plate and said fluid couplings on said first side of said plate.

13. The fuel bar as set forth in claim 12, wherein said bolt tightens said seal pack onto said plate, and against the housing.

14. The fuel bar as set forth in claim 8, wherein said nipples extend at a non-parallel angle from said plate relative to an angle of extension for said pipe connection.

15. A gas turbine engine augmentor comprising:
a turbine exhaust case, said turbine exhaust case mounting a spray bar;
a fuel bar including at least a pair of fuel pipes each leading to a plurality of spray nozzles, and said fuel pipes extending to a fluid coupling assembly;
a fluid coupling assembly including a single fluid connection having a plate and at least a pair of nipples extending away from said plate in a first direction, and at least a pair of connection pipes for being connected to each of said nipples extending from said plate in a second opposed direction, said nipples including a thread at an outer periphery, a ramped surface spaced in a direction beyond said thread and towards said plate, and a ditch beyond said ramped surface, a fluid coupling connected to each of said nipples, said fluid coupling having a thread at an inner periphery received on said thread on said nipple, and said coupling having a plurality of circumferentially spaced fingers spaced by grooves, with said fingers being snapped into said ditch and biased against said ramped surface; and
said plate, said at least a pair of nipples and said at least a pair of connection pipes are all formed of an integral piece of metal.

16. A gas turbine engine augmentor as set forth in claim 15, wherein said connection pipe extending away from said second face of said plate at an angle which is non-parallel to a planer surface of said plate.

17. A gas turbine engine augmentor as set forth in claim 15, wherein said metal is a nickel based alloy.

18. A gas turbine engine augmentor as set forth in claim 15, wherein said plate has a central hole for receiving a bolt to secure said plate to a mount surface.

19. The gas turbine engine as set forth in claim 18, wherein a seal pack is associated with said plate, and between said plate and said fluid couplings on said first side of said plate, said bolt tightens said seal pack onto said plate, and against the housing.

20. The gas turbine engine as set forth in claim 15, wherein said nipples extend at a non-parallel angle from said plate relative to an angle of extension for said pipe connection.

* * * * *